United States Patent
Jin et al.

(10) Patent No.: US 7,299,014 B2
(45) Date of Patent: Nov. 20, 2007

(54) METHOD FOR VIDEO CALL RECEIVING SERVICE IN MOBILE COMMUNICATION SYSTEM

(75) Inventors: Jong-Hyun Jin, Seoul (KR); Jae-Cheol Kwak, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 824 days.

(21) Appl. No.: 10/024,296

(22) Filed: Dec. 21, 2001

(65) Prior Publication Data

US 2002/0080943 A1    Jun. 27, 2002

(30) Foreign Application Priority Data

Dec. 21, 2000    (KR) ................................ 2000-79871

(51) Int. Cl.
*H04B 1/40* (2006.01)
(52) U.S. Cl. ...................................................... 455/74
(58) Field of Classification Search ............ 348/14.01, 348/14.11, 14.02; 455/466, 556.1, 557, 552.1, 455/74
See application file for complete search history.

(56) References Cited

U.S. PATENT DOCUMENTS 5,966,165 A * 10/1999 Eddington ............... 348/14.01

6,377,818 B2 * 4/2002 Irube et al. ............... 455/556.1

FOREIGN PATENT DOCUMENTS

EP    1096771 A1 *    5/2001

* cited by examiner

*Primary Examiner*—Melur Ramakrishnaiah
*Assistant Examiner*—Alexander Jamal
(74) *Attorney, Agent, or Firm*—KED & Associates, LLP

(57) ABSTRACT

A method for a video call receiving service in a mobile communication system is disclosed, in which a video call and a voice call can be distinguished using a sub-address of the mobile communication system and a user is able to receive the call selectively. The method includes transmitting a message, including a sub-address corresponding to either a voice call and a video call, from an origination terminal to a destination terminal. A call is connected between the origination terminal and the destination terminal in accordance the sub-address received by the destination terminal. The video call and the voice call are distinguished through the sub-address, the user is able to receive the call selectively, and the connection of the respective call can be automatically performed, thereby reducing the processing load on the system.

11 Claims, 5 Drawing Sheets

FIG. 4

| NDC (NATIONAL DESTINATION CODE) | SN (SUBSCRIBER NUMBER) | SA (SUB-ADDRESS) |
|---|---|---|

METHOD FOR VIDEO CALL RECEIVING SERVICE IN MOBILE COMMUNICATION SYSTEM

BACKGROUND OF THE INVENTION

1. Field of the Invention

The present invention relates to a mobile communication system and, more particularly, to a video call receiving service using a sub-address of the mobile communication system.

2. Background of the Related Art

Generally, a mobile communication system is a communication system featuring radio communication between a moving element, such as a ship, airplane, and car, and a fixed station. Types of mobile communication include land mobile radio communication, oversea mobile radio communication, and air mobile radio communication, according to the locations where the moving radio station moves. The mobile communication system may employ an Advanced Mobile Phone Service (AMPS) system protocol using an analog method, a Code Division Multiple Access protocol (CDMA), a Time Division Multiple Access (TDMA) system protocol, a Frequency Division Multiple Access (FDMA) system protocol using a digital method, a Personal Communication System (PCS) protocol, and an International Mobile Telecommunication in the year 2000 (IMT-2000) system protocol.

FIG. 1 illustrates a background art mobile communication system structure. The mobile communication system comprises a terminal 10 that supports the AMPS system and the CDMA system, selectively or simultaneously, and allows a subscriber to communicate through the mobile communication network. A base station 20 performs the communication with the terminal 10 using an IS-95 protocol in a radio section. A control station 30 connected to the base station 20 controls a radio link and a wired link and also performs a hand-off function. An exchanger 40 connected to the control station 30 constructs a communication path of the subscriber and connects to another communication network.

Therefore, the terminal is able to perform a call through the base station 20, the control station 30, and the exchanger 40. A numbering system of the CDMA mobile terminal is designed to make a call by allocating one number for one terminal 10. However, the mobile terminal does not differentiate a video call and a voice call. Therefore, only one number is allocated to a video terminal without division between the video call and the voice call.

The IS-95 CDMA mobile terminal uses one of two numbering systems, such as an American Standard Code for Information Interchange (ASCII) system and a Dual Tone Multi-Frequency (DTMF) system. Presently, the CDMA terminal in Korea uses the DTMF system. However, the CDMA terminal transmits the telephone number using a message in a radio section, not using call processing in a band like in a wired telephone. Also, the CDMA method allocates only one telephone number to a Mobile Identification Number (MIN) applied to a terminal.

If a video terminal method based on an ITU-T H.324 standard is applied to the mobile terminal, the subscriber cannot select to answer the call as a video call or a voice call, because the video terminal method is operated by recognizing a general physical layer as a device, such as a modem.

Therefore, the subscriber may pre-designate a setting for receiving either the voice call or the video call, in order to answer the call as the video call or the voice call. However, even in this case, the mobile terminal can only be used for the pre-designated use.

That is, according to the method for video call receiving in a mobile communication system of the background art, there is no certain method for distinguishing the video call and the voice call. This is because a standard for receiving the video call of the CDMA video terminal is not designated, and the method in which call kinds of the mobile terminal are pre-designated, for solving the above problem, is able to receive only the pre-designated kinds of calls.

SUMMARY OF THE INVENTION

An object of the invention is to solve at least the above problems and/or disadvantages and to provide at least the advantages described hereinafter.

Therefore, an object of the present invention is to provide a method for video call receiving in a mobile communication system by which a video call and a voice call can be distinguished using a sub-address of a mobile communication system.

Another object of the present invention is to provide a method for video call receiving in a mobile communication system by which a subscriber is able to selectively answer the video call and the voice call.

To achieve the objects of the present invention, as embodied and broadly described herein, there is provided a method for recognizing the voice call and the video call of the terminal. The method includes constructing a numbering system, including a sub-address corresponding to the voice and video calls in a mobile communication system, that is able to transmit/receive the voice call and the video call.

In addition, there is provided a method for a video call receiving service in a mobile communication system comprising: transmitting a message including a sub-address corresponding to the voice call and the video call by an origination terminal; and connecting a call between the origination terminal and a destination terminal according to a recognition result, after performing a recognizing operation, according to the sub-address, by the destination terminal which received the transmitted sub-address.

Also, there is provided a method for a video call receiving service in a mobile communication system comprising: transmitting a message including a sub-address corresponding to a voice call and a video call by an origination terminal; deciding whether or not an originating continuation message is included in the message by a destination terminal, after receiving the message of the origination terminal; distinguishing the voice call and the video call by identifying the transmitted origination message, if the message includes the originating continuation message; and connecting a call between the origination terminal and the destination terminal, according to the result of distinguishing the video call and the voice call.

The object of the invention may be further achieved in whole or in part by a multimedia communication method, including receiving an originating message communicated wirelessly by an origination terminal, distinguishing a call from the origination terminal as a video call or a voice call based on the originating message, and connecting a destination terminal to the call using a communication medium identified by the originating message.

The object of the invention may be further achieved in whole or in part by a multimedia communication method, including distinguishing a call as a video call or a voice call based on the type of communication medium generating the call; identifying the call type and a communication medium in a sub-address field of an originating message; transmitting the originating message to a destination terminal by wireless transmission; and connecting the call to the communication medium identified by the originating message.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 illustrates a numbering system.

DETAILED DESCRIPTION OF PREFERRED EMBODIMENTS

Reference will now be made in detail to the preferred embodiments of the present invention, examples of which are illustrated in the accompanying drawings.

A service application method for a present sub-address system is not defined by a standard related to a mobile communication system. However, the sub-address system applied to an Integrated Service Digital Network (ISDN) recognizes a plurality of terminals so as to be fit in with objects. Each terminal connected to one ISDN compares the transmitted sub-address with its own sub-addresses and recognizes that it is a destination terminal, if the compared sub-addresses coincide.

The present invention selectively receives a destination call using a sub-address system, defined in North American CDMA standards higher than IS-95B. The mobile terminal has different characteristics from those of the ISDN, in which a plurality of terminals can be connected to a wired section. However, a plurality of numbers are allocated to a destination terminal and, therefore, the video call and the voice call can be distinguished.

In the above method, sub-addresses corresponding to the video call and to the voice call are allocated in advance, and the corresponding answers (i.e., video call or voice call) made by the destination terminal are processed when the sub-addresses are terminated. If the sub-addresses are not terminated or another sub-address is terminated, the terminal does not receive the call.

Figure 1:
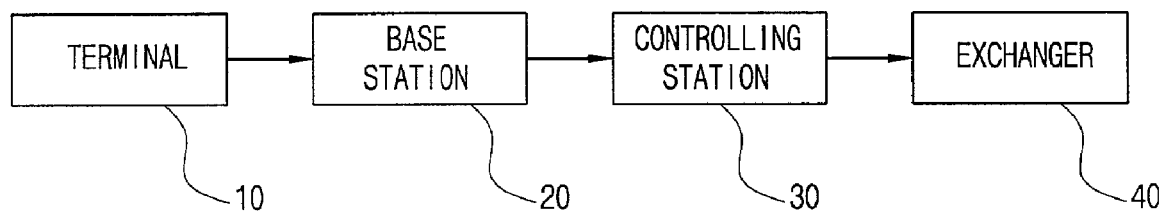
FIG. 1 illustrates a background art mobile communication system.
Figure 2:
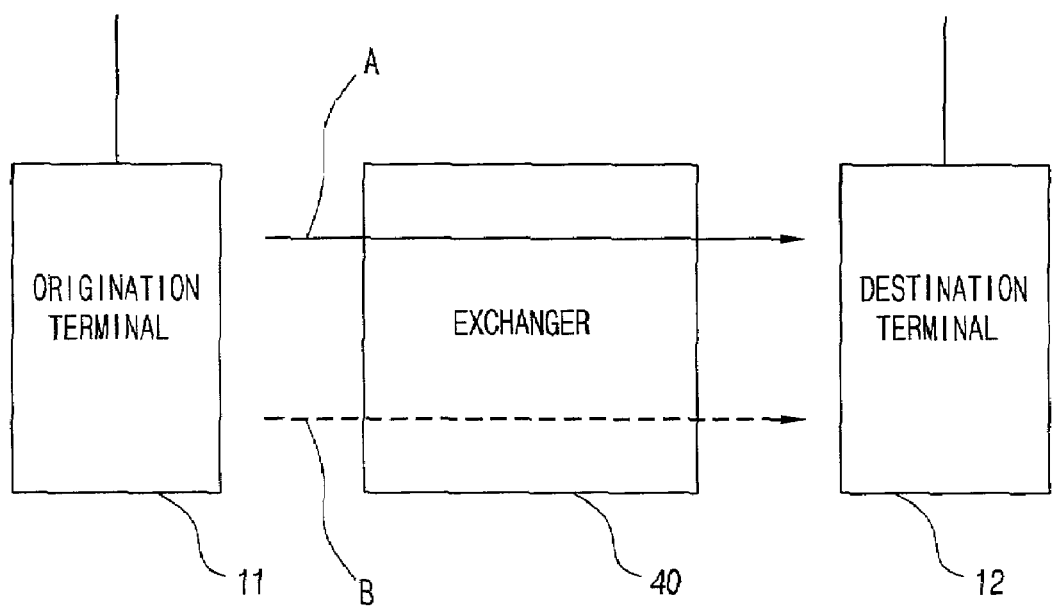
FIG. 2 illustrates a mobile communication system using a sub-address according to the present invention.

FIG. 2 illustrates a mobile communication system using a sub-address according to the present invention. When an origination terminal 11 transmits a voice call and a video call through an exchanger 40, a destination terminal 12 recognizes the calls according to sub-addresses transmitted from the origination terminal 11. The destination terminal 11 supports the sub-address system for the video call and the voice call.

The destination terminal 12 receives the call by distinguishing the video call and from the voice call only when the video call and the voice call distinguishing function is set (A). Otherwise the destination terminal 12 receives the call as a voice call, as it would in a voice exclusive terminal, if the distinguishing function is not selected (B).

Figure 3A:
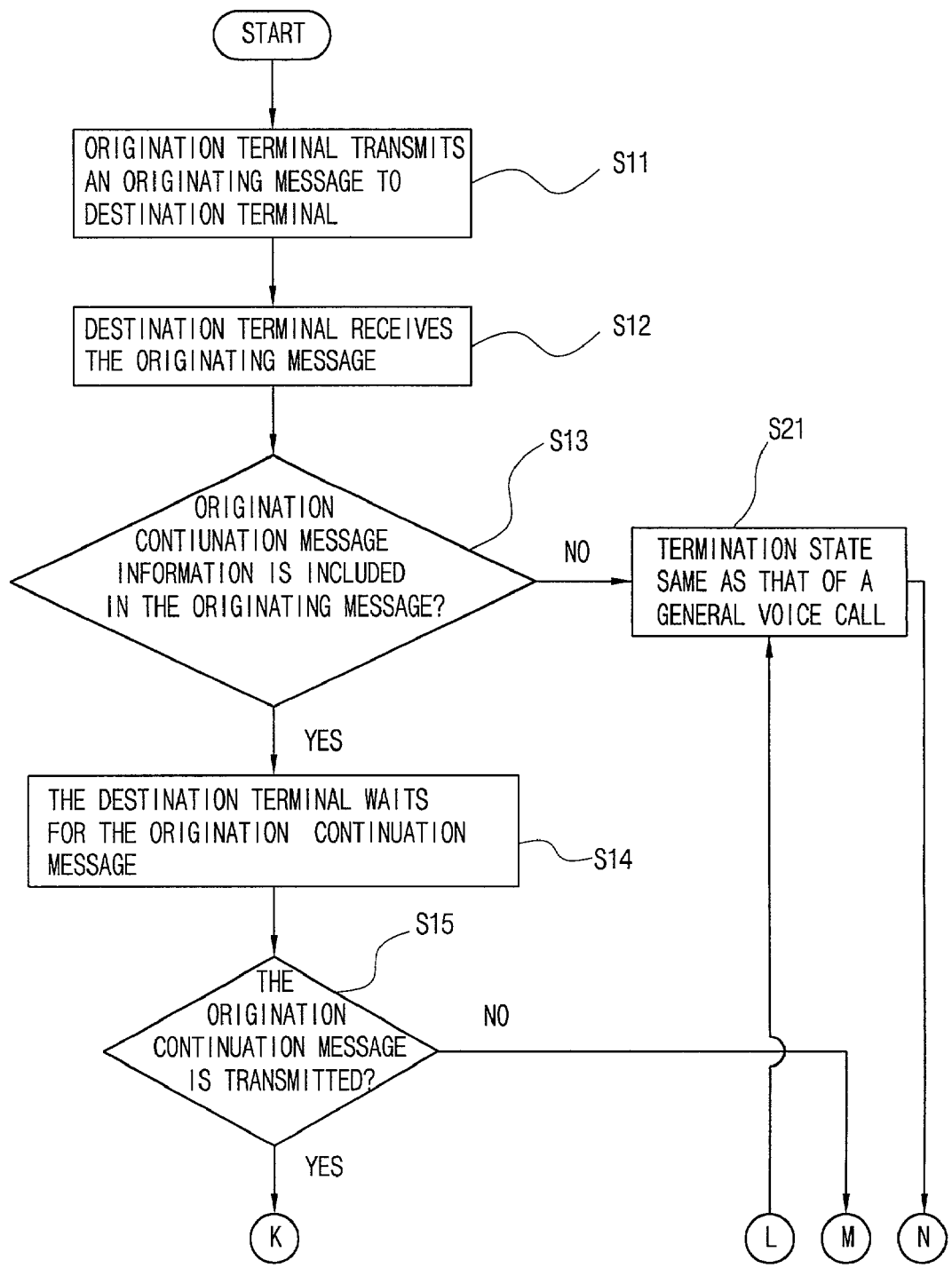
FIGS. 3a and 3b illustrate a method for a video call receiving service in the mobile communication system, according to the present invention.
Figure 3B:
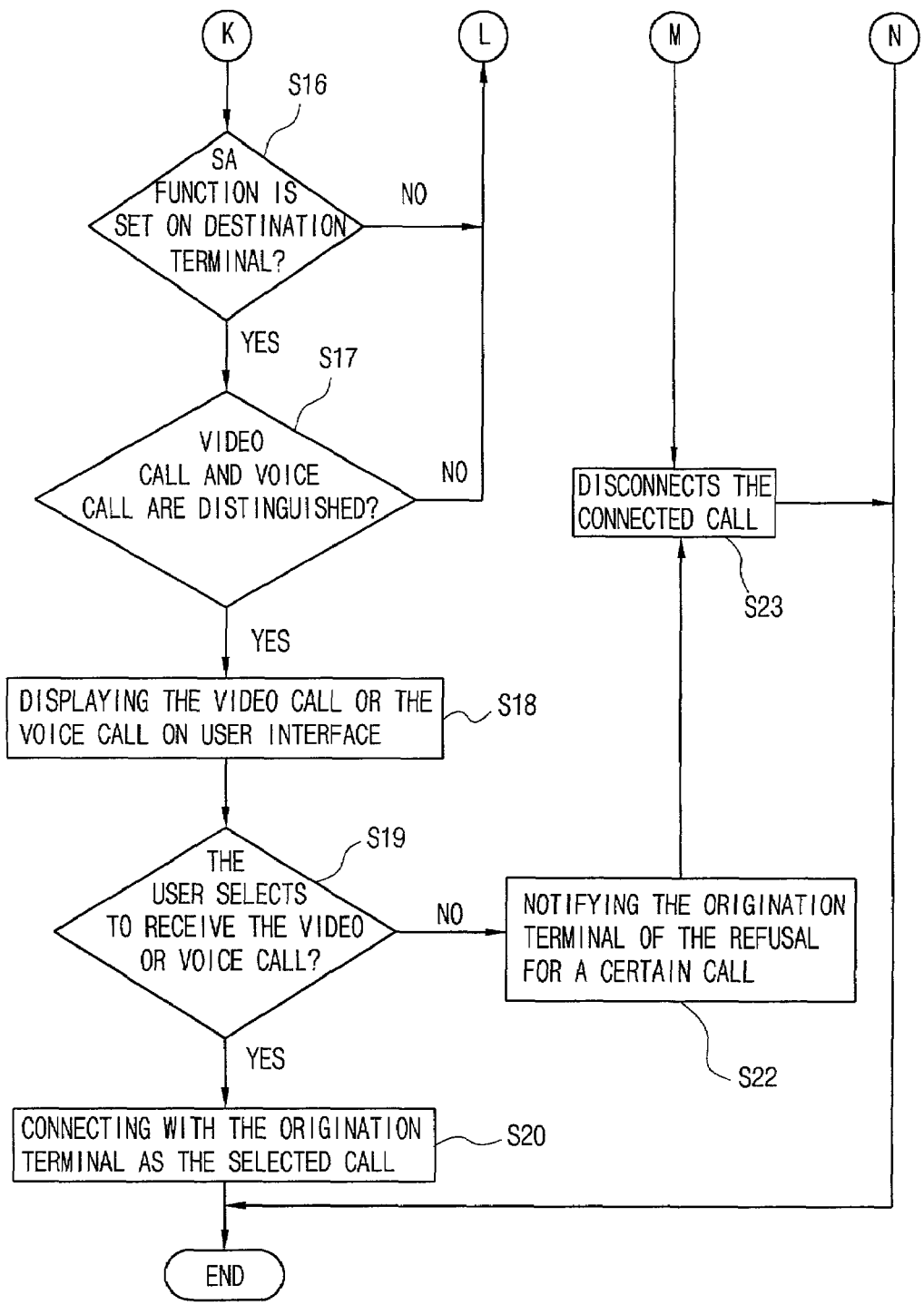

FIGS. 3a and 3b are flow charts showing a method for a voice call receiving service in a mobile communication terminal according to the present invention. As shown therein, the method for video call receiving service according to the present invention comprises transmitting an originating message, including a sub-address, by the origination terminal 11 to the destination terminal 12; and connecting as the video call or the voice call, corresponding to the sub-address, to the origination terminal 11 by the destination terminal 12 after receiving the originating message from the origination terminal 11.

When the origination terminal 11 transmits an originating message, including a sub-address corresponding to a voice call or to a video call (S11), the destination terminal 12 receives the originating message (S12). The destination terminal 12 judges whether or not the originating message includes information for an origination continuation message (S13), and the destination message waits for the origination continuation message if this information is present (S14).

After waiting a certain period, the destination terminal 12 judges whether or not the origination continuation message is transmitted (S15). If so, the destination terminal 12 then judges whether or not a sub-address function, which is able to distinguish the call, is set in the destination terminal 12 (S16). If the sub-address function is set, the destination terminal 12 distinguishes the call as a video call or a voice call (S17).

The destination terminal 12 displays the result of distinguishing the video call and the voice call on a User Interface UI (S18). Then, a user decides whether to receive the video call or the voice call (19). In addition, if the user decides to receive the video call or the voice call, then the chosen call is connected to the origination terminal (S20).

On the other hand, if (1) the originating message does not include the origination continuation message, (2) the sub-address function is not set on the destination terminal 12, or (3) the terminal could not distinguish the video call and the voice call, the termination state of the destination terminal 12 becomes the same as the termination state for a voice call (S21).

Also, if the user of the destination terminal 12 selects not to receive the video call or the voice call, the destination terminal 12 notifies a UI, of the origination terminal 11, of the refusal for a certain call (S22) and disconnects the call connected by the originating message (S23).

FIG. 4 illustrates an ISDN numbering system based on an E.164 standard, which may be supported in a Network Service Access Point (NSAP) (ITU-T Access Point Recommendation X.213/ISO 8348 AD2). The numbering system comprises a National Destination Code (NDC) for relaying the call of the destination subscriber in a communication network; a Subscriber Number (SN), which is needed to discriminate a real termination subscriber; and a Sub-Address (SA), which is granted to distinguish a plurality of terminals having the same subscriber number but various media services. The NDC and the SN are generally called a principal number, and the SA is allowed to have a maximum of 20 octets (40 digits). The setting and granting of the SA may be applied freely, because there is no definition in the standard.

The system supporting the above numbering system recognizes the destination terminal 12 through the principal number, and the SA is transmitted to the corresponding destination terminal 12. The destination terminal 12 distinguishes the video call and the voice call according to the transmitted SA and processes the call according to the type of call.

The method for a video call receiving service in a mobile communication system according to the present invention will be described further with reference to the drawings.

An IS-95 call processing message, which is related to the SA system, is preferably used in the applied terminals 11 and 12 and in the system to distinguish the video call and the voice call. In addition, numbering systems in a wired terminal and an exchanger preferably support the SA system, while otherwise operating normally.

The terminals 11 and 12, which are able to distinguish the video call and the voice call, preferably embody a UI and an additional button. Terminals 11 and 12 distinguish the video call and the voice call only in case that the video call/voice call distinguishing function is set. If the distinguishing function is not selected, the terminals are operated using the numbering system in the same manner as would a voice exclusive terminal and, therefore, the destination terminal receives the call as the voice call.

When the video and the voice call distinguishing function is selected in the destination terminal 12, the destination terminal 12 makes an inner call according to the transmitted principal number. In addition, the destination terminal 12 waits a certain period for the origination continuation message, after a traffic channel state between the origination terminal 11 and the destination terminal 12 becomes a conversation sub-state, according to a standard higher than IS-95B.

Two sub-addresses 101 and 102 are granted for the video call and for the voice call, respectively, in the destination terminal to distinguish the two types of calls. If the origination terminal 11 and the destination terminal 12 are connected by the video call, the origination terminal 11 inputs the principal number of the corresponding destination terminal, **12\*101, and transmits it. The exchanger distinguishes the corresponding terminal through the principal number of the destination terminal 12, and the corresponding destination terminal 12 waits for the origination continuation message. In the case that the origination terminal 11 and the destination terminal 12 are connected by the voice call, the origination terminal 11 transmits the principal number of the corresponding terminal, 12\*102**.

If the destination terminal 12 receives the origination continuation message including the SA information record, and the SA is 101, the destination terminal 12 is maintained in the video call receive standby state. If the SA is 102, the destination terminal 12 transitions to a voice call receive standby state. Also, if the origination continuation message is not transmitted, the destination terminal 12 notifies the origination terminal UI of the call refusal, according to the SA, and disconnects the inner call connect.

While processing the SA information record, the terminals 11 and 12 use the SA system of an NSAP, which is prescribed in International Telegraph and Telephone Consultative Committee (CCITT), Recommendation X.213/ISO 8348 AD2, or by a user definition according to the IS-95B standard. The SA system may be embodied differently by different service companies and may be embodied so as to communicate with a wired network, such as the ISDN, if the system is under a NSAP numbering system.

When the destination terminal 12 receives the SA 101 or 102, it judges the video call or the voice call according to the transmitted SA. Thereafter, the destination terminal displays a message, through the UI, asking the user whether to receive the call. If the user selects to receive the call, the origination terminal 11 and the destination terminal 12 are connected to communicate the call using the appropriate video or voice media.

If the user refuses to receive a certain call, the system informs the origination terminal 11 UI of reasons for the refusal, via a message.

As described above, according to the method for video call receiving service in the mobile communication system of the present invention, the video call and the voice call are distinguished through the SA granted to the mobile communication terminal, and the user is able to receive the call selectively. In addition, the transmission/reception of the respective call can be automatically performed and applied to the video call media.

Also, the process of recognizing and selectively processing the video call and the voice call can be performed in the terminal. Therefore, a processing load of the system can be reduced.

In addition, the method for the video call receiving service in the mobile communication system according to the present invention can communicate with a wired video terminal through a wired exchanger, and the user is able to choose the video call or the voice call. Therefore, the system can immediately respond to a user's request.

The above references are incorporated by reference herein where appropriate for appropriate teachings of additional or alternative details, features and/or technical background.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of establishing a communication between an origination terminal and a destination terminal, comprising:
   wirelessly transmitting an originating message, including a sub-address corresponding to either a voice call or a video call, from the origination terminal to the destination terminal;
   receiving the originating message and judging by the destination terminal whether there is origination continuation message information in the originating message;
   determining whether a distinguishing function is set active in the destination terminal;
   distinguishing whether a call associated with the originating message is a video call or a voice call based on the sub-address if the distinguishing function is set and if an origination continuation message transmitted after the originating message is received at the destination terminal; and
   connecting the call as the voice call or the video call, between the origination terminal and the destination terminal, in accordance with the sub-address if the origination continuation message is received and the distinguishing function is set.

2. The method of claim 1, further comprising terminating the call as a general voice call if the originating message does not include the origination continuation message information, or the distinguishing function is not active, or the video call and the voice call are not distinguishable based on the origination continuation message.

3. The method of claim 1, further comprising:
waiting for the origination continuation message for a predetermined period, if the originating message includes the origination continuation message information.

4. The method of claim 1, further comprising:
displaying on a user interface of the destination terminal the result of the distinguishing operation;
selecting whether to receive the distinguished video call or the voice call, on the user interface; and
connecting one of the video call or the voice call between the origination terminal and the destination terminal if the video call or the voice call are selected to be received.

5. The method of claim 4, further comprising notifying the origination terminal of a refusal to receive the video call or the voice call via a refusal message if neither of the video call or the voice call are selected to be received.

6. A multimedia communication method, comprising:
receiving an originating message at a destination terminal, the message being communicated wirelessly by an origination terminal;
determining whether the originating message includes origination continuation message information;
determining whether a distinguishing function is set active in the destination terminal;
distinguishing a call from the origination terminal as a video call or a voice call based on a sub-address in the originating message, by the destination terminal if the distinguishing function is set;
connecting the destination terminal to the call using a communication medium based on the sub-address in the originating message if the distinguishing function is set and the originating message includes the origination continuation message information; and
connecting the destination terminal to the call using a voice medium, if the distinguishing function is not set or the originating message does not include the origination continuation message information.

7. The method of claim 6, wherein:
the communication medium is a video medium, if the call is the video call; and
the communication medium is a voice medium, if the call is the voice call or if the originating message does not distinguish the call type.

8. The method of claim 6, further comprising:
waiting a predetermined period of time for the origination continuation message, if the originating message includes the origination continuation message information.

9. The method of claim 6, further comprising:
displaying the call type on a user interface, based on the result of the distinguishing operation; and
selecting whether to connect the destination terminal to the call through the user interface; and
transmitting a refusal message to the origination terminal, if a user selects not to connect to the call.

10. The method of claim 6, wherein the originating message comprises:
a National Destination Code (NDC) that identifies a call relay in a communication network;
a Subscriber Number (SN) that identifies the destination terminal of the call; and
the sub-address (SA) that distinguishes a plurality of communication media supported by the destination terminal.

11. The method according to claim 6, further comprising:
determining whether to connect to the call; and
transmitting a refusal message to the origination terminal, if a user selects not to connect to the call.

* * * * *